April 26, 1960 E. K. BENEDEK ET AL 2,933,885

HEAT STORAGE ACCUMULATOR SYSTEMS AND METHOD AND EQUIPMENT FOR OPERATING THE SAME

Filed May 31, 1952 5 Sheets-Sheet 1

INVENTORS
ELEK K BENEDEK.
PAUL VAGO.
BY
Elek K. Benedek.

INVENTORS
ELEK. K. BENEDEK.
PAUL VAGO.
BY
Elek K. Benedek.-

INVENTORS
ELEK K. BENEDEK.
PAUL VAGO.
BY
Elek K. Benedek.

INVENTORS
ELEK K. BENEDEK.
PAUL VAGO.
BY
Elek K. Benedek

INVENTORS
ELEK K. BENEDEK.
PAUL VAGO.
By:
Elek K. Benedek.

United States Patent Office 2,933,885

Patented Apr. 26, 1960

2,933,885

HEAT STORAGE ACCUMULATOR SYSTEMS AND METHOD AND EQUIPMENT FOR OPERATING THE SAME

Elek K. Benedek, Chicago, Ill., and Paul Vago, Buenos Aires, Argentina; Melba L. Benedek, administratrix of said Elek K. Benedek, deceased, assignor to Melba L. Benedek individually Application May 31, 1952, Serial No. 290,908

6 Claims. (Cl. 60—26)

This invention relates to heat accumulators and equipment for operating the same. More particularly, it relates to accessory means and methods whereby the superfluous heat production of a caloric heat power plant during low consumption and minimum load operating conditions, can economically be stored up by said accessory means. Said stored up or accumulated heat power then can be utilized during a subsequent high load or steam consumption operating cycle. The accumulator will reduce substantially the size and the original cost of the equipment of said heat generating power plant by storing, for instance, one half of the power output of a plant, and utilizing it later. The size and cost of the generating equipment can be reduced substantially 50% by using the system and method of this invention.

It is well known that the utility factor of conventional caloric industrial plants rarely exceeds 50% and is the ratio between the average and the peak loads. Since the boilers and connected accessories in the case of conventional installations must be rated and designed to the peak load, as to size and capacity, it is obvious that through economical distribution and utilization of the heat power surplus produced during the low load periods of the operation of these plants great savings can be effected. Also, there is a great possibility for the reduction of the size of the plant since during half of the time the load is only one-half of the peak. The capital requirement and cost of operation of these installations are substantially reduced by the present invention.

In a practical illustration of the manner in which this invention operates, let us take the boilers and burners of a, say, 100,000 lbs. per hour steam capacity power plant, which will be reduced in size and capacity to a plant of 50,000 lbs. steam per hour, thereby saving one half of the original capital necessary for a conventional peak plant and cost of its operation.

Conventional efforts and methods which are directed to the solution of an economical utilization or rather distribution of the surplus heat power of large caloric industrial plants have failed because, first of all, conventional heat storage accessories or accumulators operate on the storage of hot water and steam principles and have to store heat at higher than atmospheric pressure, and secondly, heat storage cannot be accomplished except at correspondingly higher temperatures than 100° C. These conventional heat and steam accumulators are too expensive as they have to be manufactured for high pressure with expensive materials and labor. Since the saturated steam at 100° C. reaches atmospheric (14.7 p.s.i) pressure, it is obvious that for the conventional heat accumulators atmospheric pressure is only the starting point. For the reason of excessive costs, conventional heat storage equipment is not made for pressures higher than 15 atmospheres and corresponding 197.40° C. temperature. However, most of the industrial and thermodynamic processes requires a temperature much higher than 197.4° C. For instance, uptodate steam turbines are rated and designed for 500–600° C. superheated operating steam cycles, at which temperatures present day conventional steam or water heat accumulators with the low 197.4° C. temperature limit cannot even come into consideration. A further defect of conventional steam and hot water accumulators lies in their inefficient operation. At the discharge of these steam and hot water accumulators the pressure and the temperature of their respective deliveries still further decrease, and in consequence the power stored in them can be utilized only at the expense of further loss and reduced efficiency.

The heat storage and accumulation can be carried out effectively at any pressure and temperature by the heat exchange between a solid and steam, gas or liquid with the new and useful process hereinafter specifically described.

One advantage of the present invention lies in the possible utilization of the accumulated heat at any desired pressure or temperature level as useful work or energy, and therefore at substantially greater efficiency than the transformation efficiency which was possible with conventional hot water or steam storage accumulators.

A further object of the present invention lies in the provision of a novel heat accumulator in which the storage medium is a high heat absorbing solid medium, one which absorbs large amounts of heat in small three dimensional volume and at atmospheric pressure only, thereby providing an inexpensive low pressure container for heat storage.

A further object of the present invention lies in the provision of a method whereby large amounts of heat can be stored in meltable solids by keeping the high pressure and temperature circulating fluid medium such as steam inside of heat transmitting coils in a closed fluid circuit, which coils transmit the heat into the meltable low pressure solid rather than into a high pressure, expensive, boiler.

A still further object lies in the provision of a new closed fluid circuit for large power plants in which the steam as fluid medium can be controlled to carry heat and distribute it at any desired point of the circuit in an economical way.

A still further object lies in the provision of large capacity heat storage accumulators, the size and cost of which are reduced to a mere fraction of conventional equipment of the same purpose and character.

A still further object is to use sodium or potassium nitrate salts as heat storing solid medium for the storage of large amounts of heat by utilizing the latent heats of melting and solidifying of said salts respectively.

A still further object lies in the provision of a closed fluid circuit, in which the water and steam will be used as circulating agent and sodium and/or potassium as heat storing agents respectively, to store large amounts of heat in a small volume solid in the form of the latent melting heat of the solid.

A still further object lies in the provision of a method and means by which the natural heat of the sun's rays can be stored and utilized for domestic utility purposes.

A still further object lies in the provision of methods and means whereby inexpensive and readily obtainable heat storing solids can be utilized for flexibility and economy of original cost and operation of heat power equipment.

A still further advantage of this invention lies in the small and compact volume of the accumulators. Due to the novel method and process this volume is only ⅙th of the corresponding equivalent volumes of commercial hot water and steam storage tanks.

These above enumerated advantages can be provided by the utilization of any materials for the storage of heat, the melting points of which lie respectively between the charging and the discharging temperatures of the accumulator. The physical fact that at the melting and at the solidification temperatures of solids great amounts of heat are absorbed or liberated respectively in addition to the sensible rise or fall of physical heat, presents the possibility for the storage of large amounts of heat in relatively small volumetric capacity tanks and solids as compared to the storage of heat in steam and water. The so-called latent heat of melting and solidifying solids therefore can be utilized for storing heat, in addition to the physical or measurable thermal capacity of solids at the points of the liquefaction and the solidification respectively.

For the realization of the present method any solid is suitable which has its melting point between the temperature limits of the heat cycle of the present heat storage system or heat accumulator circuit means. In modern steam power plants we can employ advantageously such solid heat absorbing or filling materials the melting temperature of which will coincide with the point of saturation of the steam or fluid medium of the system. Such filling and heat absorbing materials are, for instance, $NaNO_3$ or sodium nitrate and potassium nitrate, $KNO_3$ known under the trade name of the Saltpeter of Chile or potassium saltpeter, or a mixture of these two. The melting point of the Chile saltpeter is 308° C. which is identical with the saturation temperature of a steam of 100 atmospheric pressure, which further equals to 1450 p.s.i. (temperature in degrees Fahrenheit equals 9/5 the temperature in degrees centigrade plus 32°). The melting point of the potassium nitrate is 337° C. which corresponds to the temperature of a saturated steam at the pressure of 140 atmospheres which equals to 140×14.7 p.s.i. The eutectic mixture of the two salts melts, however, at a temperature of 218° C. which temperature corresponds to the temperature of saturated steam at 23 atmospheres pressure. The eutectic solution of the two salts is, of course, that particular alloy of the two which has the lowest possible melting point among all possible alloys of the two agents. Thus heat storage process with sodium or potassium nitrates or their proper mixture, will extend to steam pressures from 23 to 140 atmospheres. If we want to store between lower pressure limits than the above, the mixture of $$2(KNO_3)_2+(CaNO_3)_2$$

can be used, the melting point of which is 174° C. and the 50.9 mol percent mixture of these nitrates with $(CaNO_3)_2$ with a melting point of 145° C.

Among the advantages of my saltpeter process are preeminently the high melting point (308° C.), high specific heat and high conductivity, combined with low cost. For instance, the melting heat of a gallon of saltpeter is 336 B.t.u. while its specific heat is .956 cal.≅4 B.t.u. In a modern power plant we may use saltpeter between the temperature limits of 510° C. and 270° C. in an accumulator, in which event we can store 1256 B.t.u. heat per quart of the filling of sodium nitrate.

The new method of the invention is described and illustrated in connection with the accompanying drawings. Its practical application is therein shown in connection with apparatus for the storing of the surplus heat of superheated steam boilers of a steam power plant and the radiating heat of the sun respectively.

Still further objects and advantages will be apparent from the description of the attached drawings, forming part of these specifications.

Figure 5:
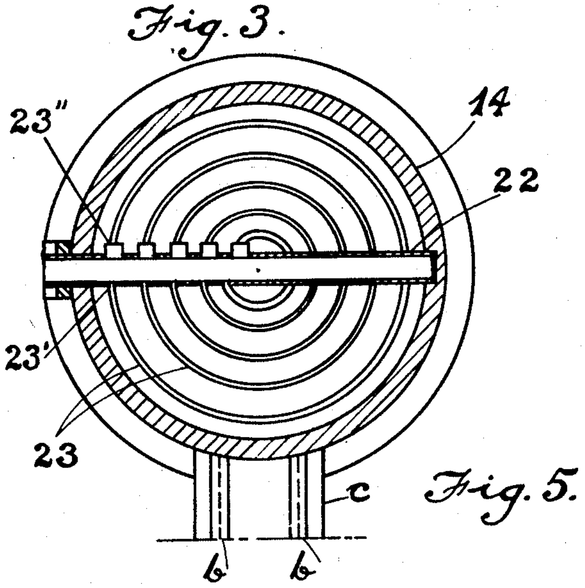
Fig. 5 is a transverse cross-section taken on line 5—5 in Fig. 3.
Figure 5A:
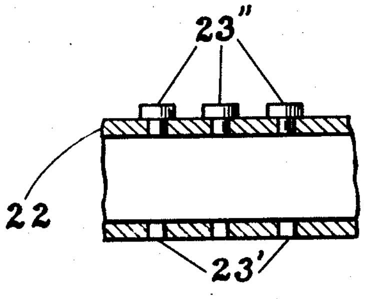

Fig. 5*a* is an enlarged fragment of collector ring 22 of Fig. 5.

Figures 6, 7:
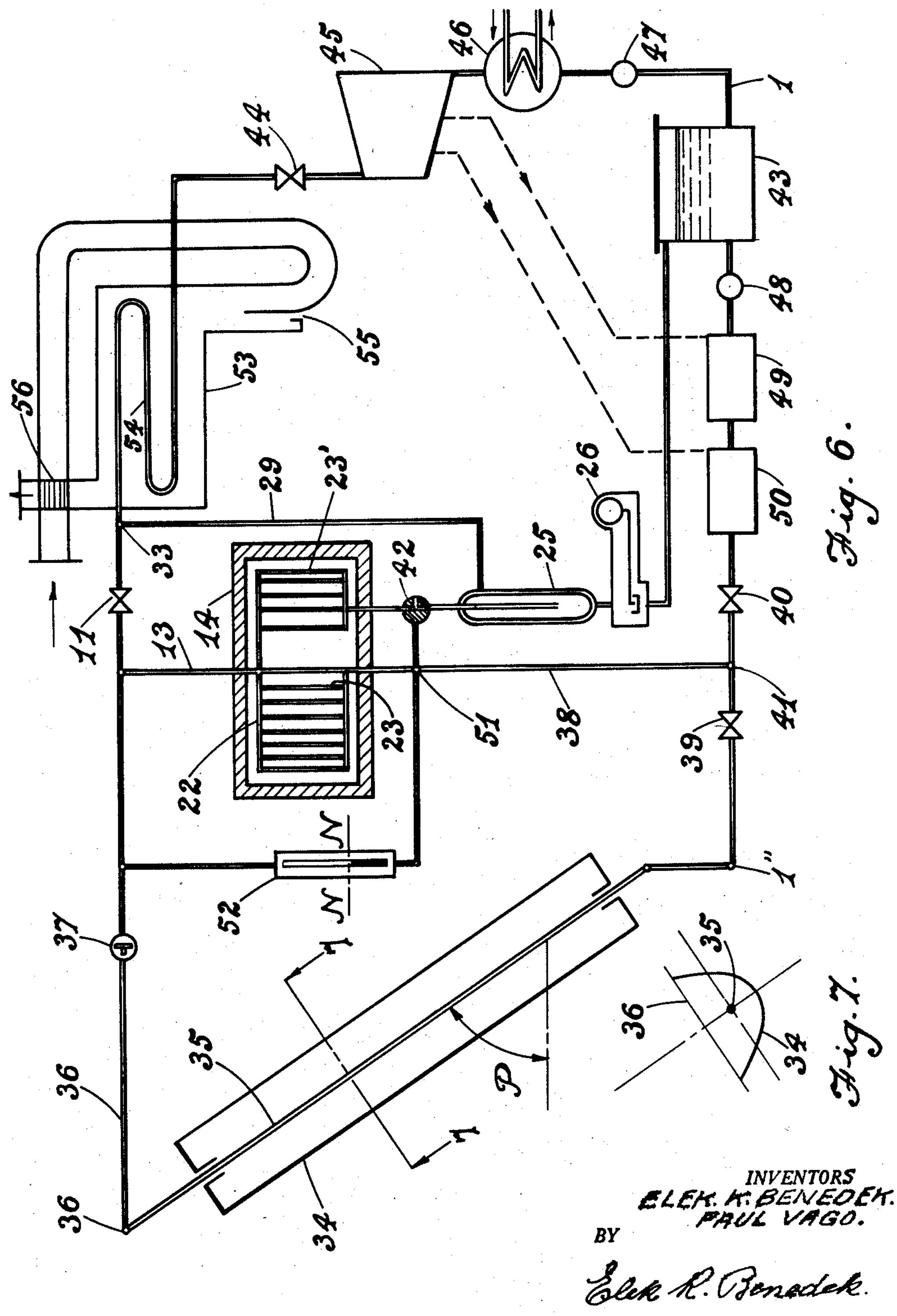

Fig. 6 shows the circuit diagram of an accumulator, heated by a parabolic mirror and the radiating heat of the sun in combination with a steam turbine.

Fig. 7 illustrates the cross-section of a parabolic mirror reflector taken on line 7—7 in Fig. 6.

Figure 8:
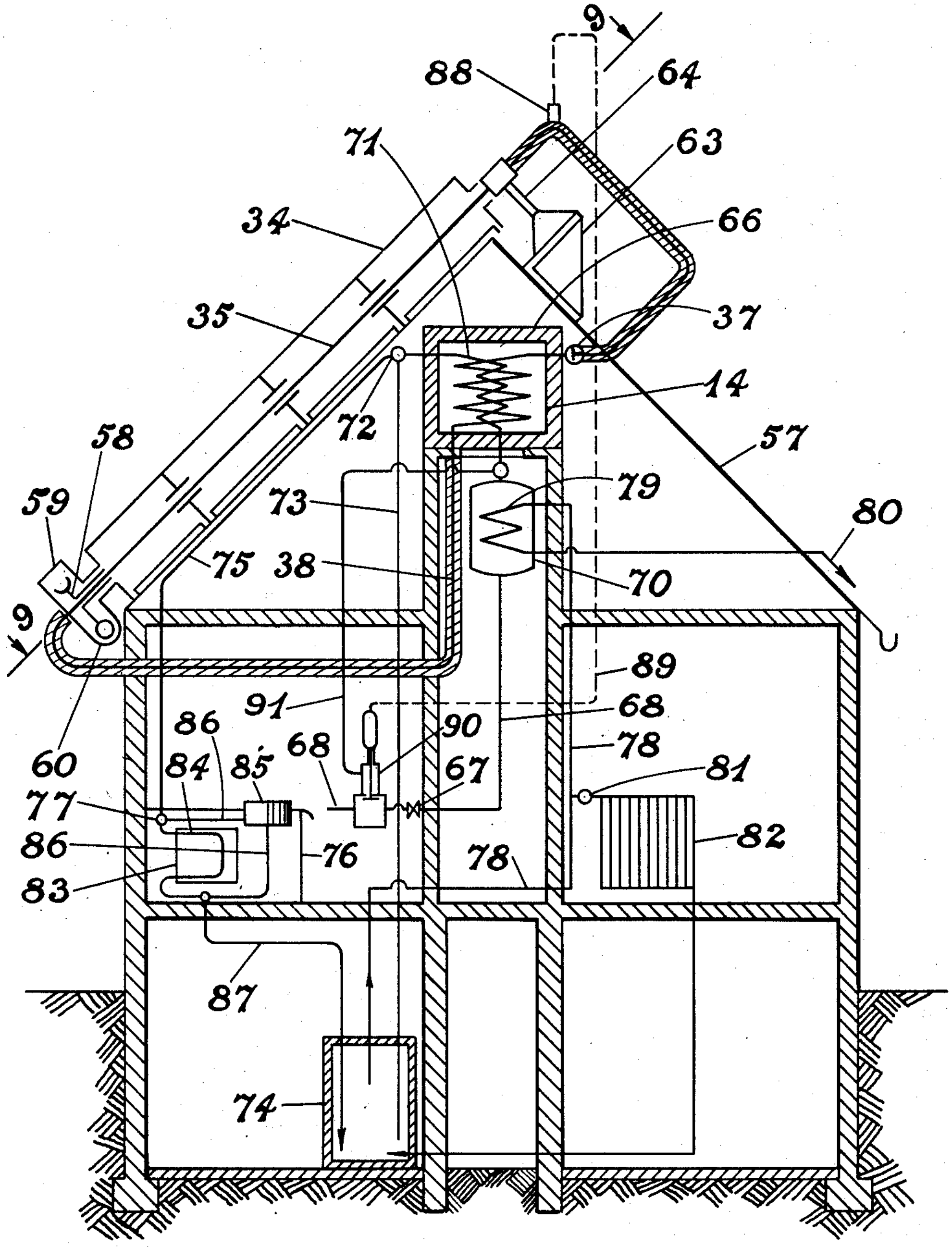

Fig. 8 shows the circuit diagram of heating installation of a house by the radiating heat of the sun via a plurality of parabolic mirrors and an interconnected accumulator, according to the inventive idea of this invention.

Figure 9:
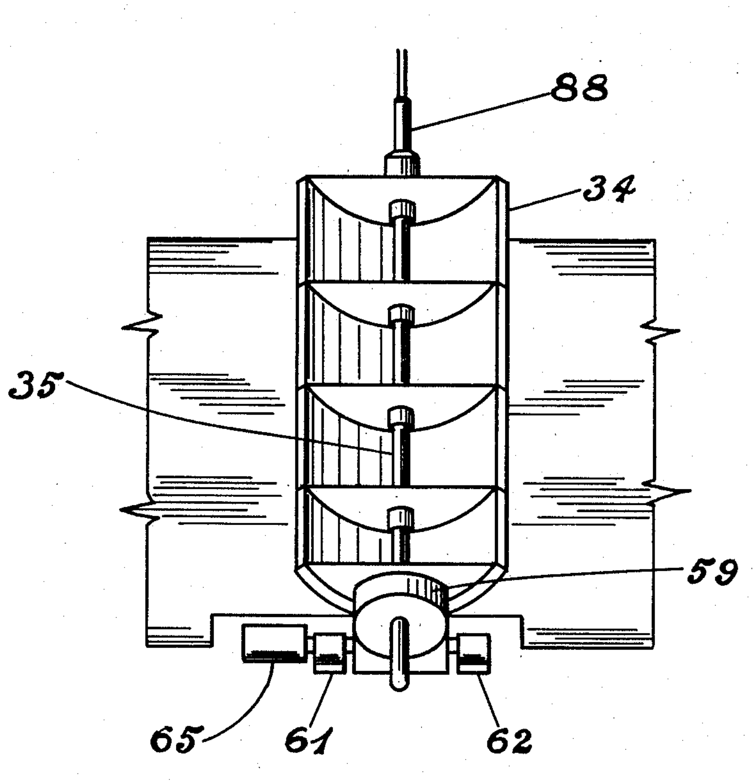

Fig. 9 is a side view 9—9 of the mirror system 35 of Fig. 8.

Figure 10:
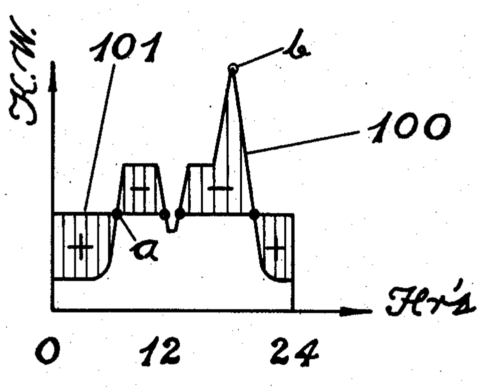

Fig. 10 is a diagram showing the operation of the installation.

Figures 1, 2:
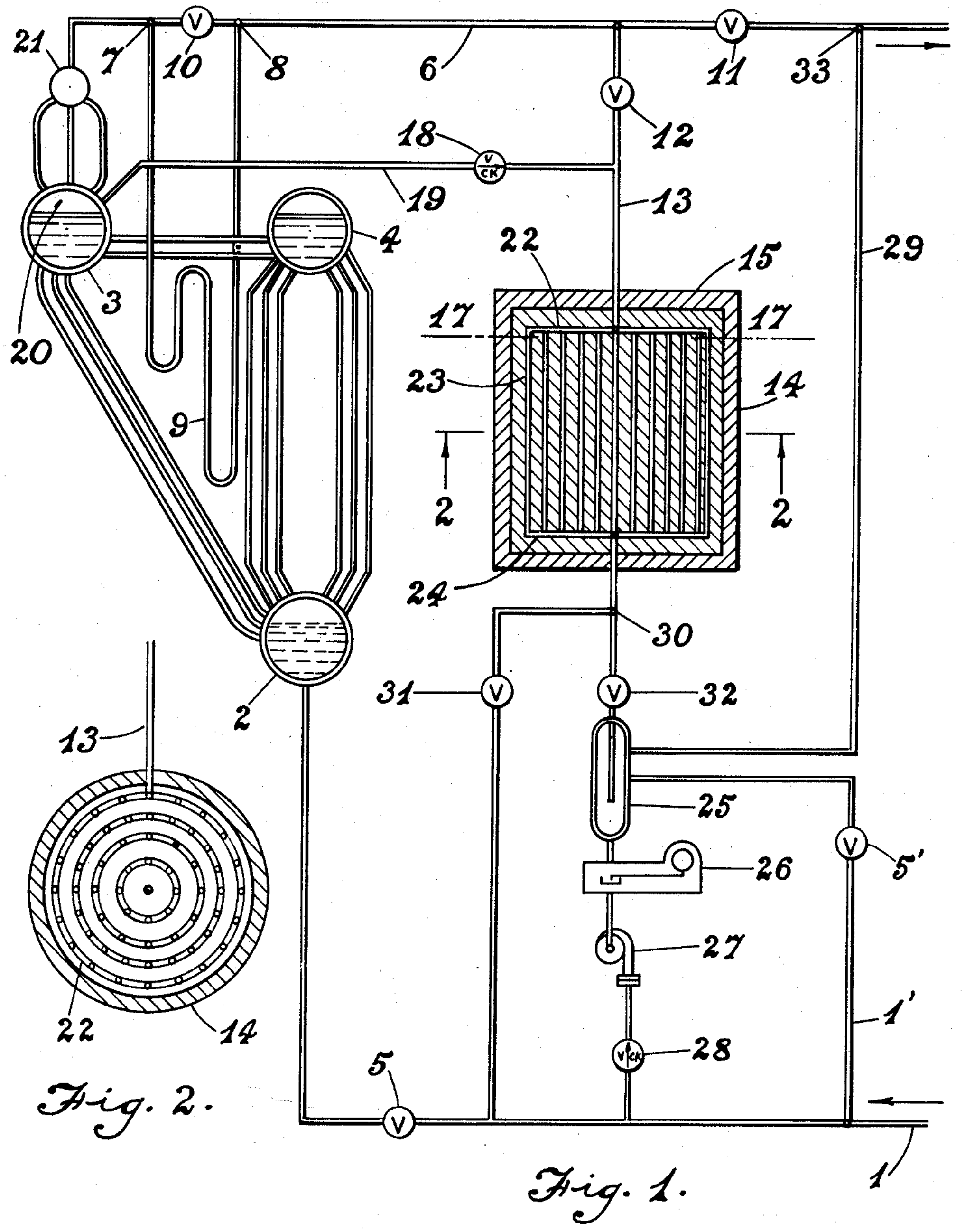
Fig. 1 shows the circuit diagram of an heat accumulator in connection with high pressure steam boilers.
Fig. 2 shows a transverse section of the accumulator of Fig. 1 taken on line 2—2.

Referring now to the figures, and more particularly to Fig. 1 and Fig. 2, in the section of feed line 1 preceding boilers 2, 3 and 4, adjustable choke or throttle valve 5 is interposed for controlling and regulating the influx of feed water into the boilers 2, 3 and 4 respectively. Also, adjustable control valve 10 is interposed between the points 7 and 8 of the exhaust or steam supply line 6, for the controlling of the superheater 9. Feed line 13 of the accumulator 14 is branched off from the discharge steam line 6 at a point upstream of a controllable choke valve 11 of the discharge or feed steam line 6, for conducting heat to storage tank or accumulator 14. Accumulator container 14 is provided with a removable cover as at 15 and an isolated sleeve 16 which is filled up to a level 17—17 with a solid material at atmospheric pressure and having good conductivity, high heat capacity and a melting point which falls between the temperature of the influx water of pipe 1 and the temperature of effluent steam of pipe 6 respectively. From a portion of feed line 13 located between valve 12 and the accumulator 14, branch line 19, provided with check valve 18 leads into the steam space 20 of boiler 3, which boiler is located under the steam dome 21 and connected thereto. Feed line 13 connects with the steam distributing conduits 22 of the accumulator as shown in Fig. 2, from which heating coils 23 branch out and extend downwardly through the sodium nitrate of the accumulator 14. Collector conduit 24 joins the lowest portions of the distributing and heating tube bundle 23, and empties into water separator 25 which is located underneath collector 24. Water separator 25 is connected to automatic drain mechanism 26 which is placed under 25. The condensed water drain 26 is further connected to the suction side of centrifugal pump 27 which again, through check valve 28, is connected to main feed water line 1. The steam space of water separator 25 is in further communication with terminal point 33 of the active steam power line 6 via pipe 29. The power line 6 and terminal 33 are in direct further connection with the power generating steam engine or steam turbine respectively, not shown in the figure. The branch point 30 between the collector line 24 and the water separator 25 is provided with the alternative valves 31—32, which can be opened or closed at will, and which are suitable on the one hand for the establishment of a connection between the water collector 24 and the terminal of main feed water line 1 by opening valve 31, and on the other hand for the cut-out of the water separator 25 by the closing of valve 32, and vice versa. The choke valve 11 is driven by a separate motor (not shown in the Figure 1) and can be controlled automatically in response to the temperature of the steam at terminal point 33, in such a manner that in response to decreasing temperature the choke valve 11 will be throttled for a lesser rate of flow while in response to increasing temperature the throttling will be done for a higher rate of flow.

The handling and operation of the heat storage accumulator is as follows. Let us assume that the accumulator has been previously discharged and that the filling matter of the container 14 is in the solidified condition corresponding to the temperature of the feed water arriving at the terminal in line 1. If the load of the power machine is decreasing, the flow of steam in power line 6 also will decrease and in this event, at the connecting point 8 of superheater 9 a certain amount of pressure and temperature rise will be created and a certain amount of superheated steam surplus will be available at the terminal point 8, provided however that the rate of fueling of the boilers will be kept up uniformly at the most economic rate of steam production. For the storage of this superfluous steam let us close valve 31 with the simultaneous opening of the interconnected alternate valve 32. At the same time let us open the valve 10 of the superheater 9 and the feed valve 12 of the storage accumulator 14. Let us adjust throttle valve 11 to the exact point of opening at which, at terminal 33 the new rate of flow of superheated steam will be sufficient and stationary for the purpose of feeding the power machine (steam turbine) at its reduced rate of steam consumption and power output respectively. Due to the proper adjustment of throttle valve 11, the superfluous steam will flow into the tubing bundle 23. The saturation temperature of the steam is now somewhat higher than the melting point of the sodium nitrate, due to the increased pressure of the steam. Consequently the steam flowing through the tube bundle 23 will give off first the superheated part of its total heat content at the top level 17—17 of the container 14, then the heat content corresponding to the heat of evaporation will be given off at the lower part of the tube bundle 23. The steam will condense in this lower portion of the tube bundle 23 in proportion to its surrendering of its evaporating heat content. The condensed water, accumulated and precipitated in water separator 25 will flow down to main feed line 1 through the automatic condensate drain 26 and through centrifugal pump 27 respectively. Centrifugal pump 27 will then pump the condensate through downward opening check valve 28 into feed line 1 and back to boiler 2 respectively. The steam which did not precipitate in tube bundle 23 will be mixed as saturated steam with the highly superheated steam of line 6 at the main terminal point 33 through line 29 in the desired proportion of the new superheated steam. In this process the filling solid matter surrounding and packed about the tubing of bundles 23 will be heated first to its melting temperature in its full mass, and thereafter the melting will proceed from the top of bundle 23 to the bottom. It is noteworthy that during this melting process of the sodium salt the volume of the salt undergoes a considerable increase of volume, which growth or dilatation in case of the $NaNO_3$ is about 15% of the original volume, that is the volume of the melted salt is 15% greater than the volume of the solid salt. Therefore, in the process of charging the accumulator 14, the charging must proceed from the top toward the bottom of the accumulator as hereinabove described. The melting of the salt notably takes place first around the wall of the downward spiraling tubes of bundle 23. As soon as a melted layer directly surrounds the tube or tubes, it can flow upward to the still solid level 17—17, then it will spread over the top of this solid level 17—17 until the entire solid will be melted. This melting process will continue at substantially constant temperature as long as the entire mass of the solid will become liquified. At the moment of the complete melting of the solid the evaporation heat of the condensate, which is returned into boiler 2 by centrifugal pump 27, will be equal to the melting heat of the solid plus any measurable thermal heat thereof above the temperature determined by the saturation of the liquid salt above its melting temperature. From this above heat balance this first phase of the heat storage process can be calculated. This charging or storing process takes place with very excellent heat transfer coefficients. If the filling salt of the accumulator is completely melted, and has reached the temperature of saturation of the steam, then further condensation will cease, and further heat transfer will be possible only through the transmission of heat via the superheating heat of the steam. This heat transfer on the steam side, however, takes place with a substantially lower heat transfer coefficient than occurs during the phase of condensation, which, however, through the increase of the flow velocity of the steam can be substantially augmented. If in line 6 the consumption of steam is normal through the automatic operation of valve 11 the steam velocity in bundle 23 can be increased in proportion to the reduction of the stored heat in the accumulator 14. If the conditions of operation regarding the load are such that after the completion of the melting process there is still sufficient time available before starting the discharge of the accumulator, which in most instances is always the case, the accumulator can be charged almost up to the temperature of the superheating. If, however, the operating conditions are such that there is no sufficient time available for reaching the superheating because there is no steam consumption at all in line 6, then the transfer of heat and the flow of steam can still be maintained by injecting feed water into separator 25, in which event water separator 25 will function as an injection condensator. For this event auxiliary branch line 1' may be used in connection with main line 1 and water separator 25 provided with shut-off valve 5'. If, however, the accumulator previously was charged up to the saturation temperature of the steam, the steam condensed in the water separator 25 will dispense with one portion of its total superheated heat content, while the remainder of its heat content will be returned to the boiler 2 by pump 27. It is evident, therefore, that with this installation the charging of the accumulator can be made entirely independent from the steam consumption which depends on the operating conditions of the powder plant.

The charged accumulator can be used also for supplying an amount of steam greater than the average steam consumption. This is done by the changing over of the alternate valves 31—32, and by simultaneously closing feed valve 12 and the full opening of valve 11. Since at this increased load the velocity of the flow of steam in line 6 also will be substantially increased, this changeover can be carried out also automatically by means of a venturi controlled automatic servomotor installation interposed in pipe 6. At the discharge of the accumulator 14 the control of the superheating will be taken care of by valve 10. After the changeover of alternate valves 31—32, an amount of feed water corresponding to the overload will be injected into tube bundle 23, via collector conduit 24 by means of the appropriate adjustment of control valve 5. The line feed water will flow in upward direction in the tube bundle 23, therefore in the lower portions of these tubes 23 the feed water will be evaporated, while at the upper portions it will be superheated.

Figures 3 to 5*a* show that particular construction of an heat storage accumulator which, according to my discoveries, is the simplest yet most suitable embodiment of an heat storage accumulator, which is applicable in connection with water-steam boilers, wherein the feed water is sufficiently cleaned and softened to avoid the formation of solid calcium deposits on the walls of the boilers, tubings and the heat transmitting working surfaces of the heat storage accumulator. In this instance the tube bundle 23 may be formed from a plurality of spiral shaped tubing, which tubing are fastened at their upper ends in the appropriate holes 23 of steam distributor pipe 11. Opposite to holes 23′ removable plugs 23″ are provided in the steam distributor 22, the removal of which plugs 23″ opens the way for the cleaning of the tube spirals by appropriate soft wire brushes or the like. With this or similar means, the tube spirals may intermittently be cleaned from certain dust-like depositions on the tubings.

Figures 3, 4:
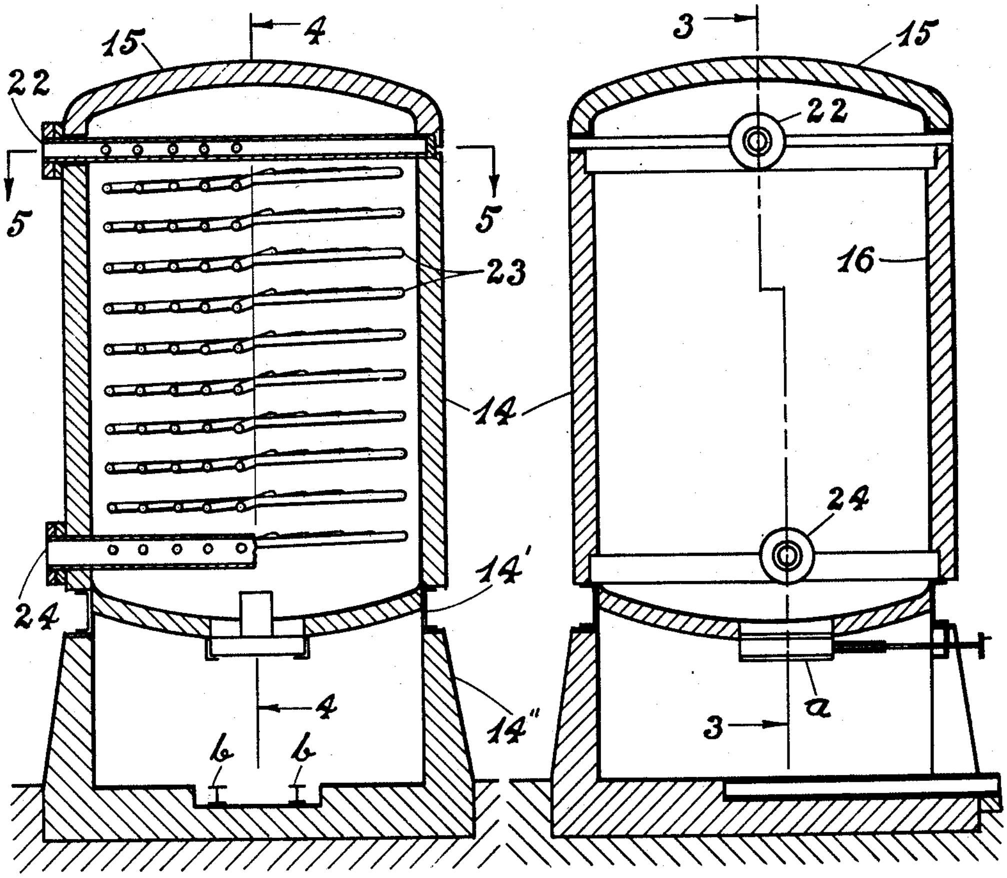
Fig. 3 is a vertical meridian cross-section of an heat storage accumulator, designed in accordance with the inventive idea. and taken through line 3—3 in Fig. 4.
Fig. 4 is a vertical meridian cross-section of an heat storage accumulator taken on line 4—4 in Fig. 3.

The steam distributor 22 is maintained between the removable top 15 and the body of the accumulator 14 by laying its respective ends on opposite walls of the cylindrical body of the accumulator 14. The lower ends of the tubings of the tube-bundle 23 are fastened with their lower ends into respective holes of the condensate collector tube 24. In order to connect the ends of each spiral tube with the respective collections 22 and 24 in a direction normal to the collectors, these tubes 22 and 24 are disposed as shown in Fig. 4. This disposition shows the pipes 22 and 24 as shifted relative to each other laterally one-half a tube diameter. Heat accumulator 14 rests on the ring-shaped U structure 14, which again is supported on reinforced iron structure 14′. According to Fig. 5, support structure 14″ is provided with an opening as at *c* for the entrance of a wagon, and therefore rails *b* are provided for the wagon under the accumulator 14. The bottom of the accumulator is provided with a shiftable closure, operable by hand, while the like is provided for opening the accumulator and draining the molten salt of sodium or potassium into an appropriate container car or wagon, in case of repair or inspection.

Fig. 6 and Fig. 7 show a different application of the present invention. In this modification of the inventive idea the boilers 2, 3 and 4 of Fig. 1 are replaced by a sun boiler or mirror 34 which is made out of sheet metal aluminum or of aluminum foil. This can be rolled upon some appropriate carrier base, such as for instance suitable plastic sheets or sheet metal sheets respectively. These sheets are bent to parabolic form as shown in Fig. 7. This mirror 34 is mounted about an axis 35, which axis also forms the heating pipe or boiler of the mirror system 34. About this boiler axis 35 mirror 34 is rotatably mounted. The location of the heating pipe 35 is in the geometrical focus of the parabolic shaped mirror 34. The rotatable parts are also so constructed that their point of the center of gravity will fall into said focal point or axis 35. In an installation there may be provided a plurality of sun mirror and boiler assemblies to collect the necessary amount of heat for the purpose wanted. The axes of the heating tubes 35 are arranged parallel to the axis of rotation of the earth, so that these tubes or tubings will point from north to south and at an angle *p*, corresponding to the position of the geographical latitude at the respective place of an installation. With such arrangement of the sun mirrors 34, the heating pipes or tubes 35 can be operated by a connected clock works mechanism or by a servomotor, controlled by said clock works mechanism. In this manner the mirrors will be rotated about the axis of pipes 35 at uniform angular velocity, following the direction of the uniform rotation of the sun about its apparent axis. It will be seen that by this arrangement the mirrors will follow the course of the sun and the sun rays will strike the mirrors parallel, at their maximum intensity to the axis of the parabola and will concentrate the rays in the focal point 35 which is also the heating pipe or sun boiler 35. For greater amount of heat energy I provide a plurality of boilers 35 and arrange them in parallel position with each other and interpose them between feed water supply line 1″ and active steam supply line 36 respectively. The steam collector and conduit line 36 joins, through check valve 37, the steam feed line 13 of the accumulator 14. The feed line 13 communicates with distributor tube 22, from which two groups of tubes, or tube bundles 23 and 23′ branch out and are surrounded by the filling matter. The lower end of bundle 23′ connects, through line 38 between valves 39 and 40 with the terminal point of main feed line 1, at point 41. Downdraft line 38, therefore, through the opening of valve 39 creates connection between bundle 23 and the heating pipe 35. The lower end of bundle 23′, on the other hand, is in connection with rotary two-way valve 42, which in its illustrated position connects the bundle 23 with water separator 25, and simultaneously separates 23 from downdraft line 38. By the rotation of valve 42 at an angle of 90°, connection will be established between bundle 23 and downdraft line 38. At the same time we close the connection between 23 and the separator 25. The condensate accumulated at the bottom of separator 25 will flow through the drain control 26 into feed water reservoir 43. The steam space of water separator 25 communicates through pipe 29 with steam conduit 36 at the terminal point 33. Between branching points 13 and 33 is interposed control valve 11. The steam line 36, through starting valve 44 further connects to steam turbine 45, the exhaust port of which leads to condenser 46. The condensate is delivered to tank 43 by means of condensate pump 47. Feed pump 48 pumps the feed water from tank 43 back into the sunboiler 35 after the water is preheated, in preheaters 49 and 50 respectively, by bleeding the steam of the turbine 45 into the preheaters. Between the dividing point 51 of line 38 and line 36 water level meter 52 is interconnected, as shown in Fig. 6 at the lower level N—N of the bundles 23 and 23′ respectively.

The operation of the apparatus is as follows. Before the starting of the turbine 45 we charge the accumulator 14. For this purpose we close starting valve 44 and by means of rotary valve 42 we establish connection between bundle 23′ and downdraft line 38, with the simultaneous closing of the connection between separator 25 and bundle 23′ After this, we open valves 39 and 40, and by starting feed pump 48, we fill the system with water up to the level N—N of the water level meter 52, in which position the water will reach the lower end of the tube bundles 23—23′. After this we close valve 40, shut off pump 48, and set and start the clock-works of the mirrors 34 according to the position of the sun. The reflected heat of the sun rays will boil up the water in the heating tubes 35, consequently the generated steam pressure will increase and flow through tube 36 into the accumulator 14 and the increase will continue until it will reach the saturation point corresponding to the desired operating temperature of the accumulator. The operating pressure and temperature of accumulator 14 is governed by a pressure relief valve (not shown) enclosed in line 13. At this temperature and pressure point condensation starts in the accumulator 14, and the accumulator will pile up the heat of condensation in the saltpeter against which the liquid heat of the condensed steam through downdraft line 38 will be returned to the heating tubes 35 through the thermosyphon effect of the circulating water of the accumulator closed circuit where the feed water will be again evaporated. Under the effect of this heat cycle, the accumulator 14 can be charged to the temperature corresponding to the operating pressure of the safety relief valve installed in the accumulator feed line 13. At the completion of the charge the upper layers of the heat absorbing sodium or potassium nitrates of the accumulator will reach the temperature of the superheated steam from the heater 35, whereas the lower layers will reach only the temperature of saturated steam. Additional heat transfer through condensation of the steam is not possible.

After reaching the temperature of the saturation of the steam the steam turbine 45 can be started. For this purpose we start the condensate 47 and feed pumps 48 respectively, and open the starting valve 44. If sun heat is available we keep the water level in water gauge 52 at level N—N by the manipulation of feed valve 40. If the load of the turbine is less than what energy is available through the sunheat, then by the surplus heat energy the accumulator charging can be continued. This can be achieved by the appropriate setting of choking or throttle valve 11, and by the proper positioning of the connections between tube bundle 23′, valve 42 and water separator 25. With this connection or hook-up the surplus heat generated in the heating tubes 35 will be stored in the accumulator as long as the superheating ahead of the turbine 45 can be brought to a stabilized temperature value. This process may be continued until the filling material of the accumulator reaches the permissible superheat temperature in its entirety. If this limit condition with the accumulation of heat is reached, and the load of the turbine is not yet sufficiently high to take advantage of it, by advancing the respective position of mirrors 34 forward with regard to the sun, the balance of the load and produced power can be reestablished. During intermittent cloudiness the accumulator 14 automatically will take over the supply of heat for the turbine 45, since due to the cessation of the evaporation in the tubes 35, the water level will automatically rise in the accumulator 14. The water in the lower levels of the tubes 23 and 23′ will be evaporated, while at their higher levels it will be superheated. The superheating, however, in this manner can be kept up only to the utilization of certain portion of the accumulated heat, between permissible temperature limits. If we want to operate for extended periods of time with accumulated heat, then before all we close valve 39, so that in boiler pipes 35 the heat of the preheated water will be preserved.

On the steam side no losses can enter, since the back flow of steam into boiler pipe 35 is prevented by the unidirectional check valve 37. There is no flow toward the heating pipes 35. The stationary superheating against an arbitrary discharge of the accumulator can be achieved only by the interconnection of an artificial heat source such as 53 into the steam line circuit 36. This can be done, for instance, by means of an hot air furnace 53 which surrounds and heats a serpent shaped pipe section 54 of the steam line 36 and a burner 55, in which, for instance, oil or gas can be burned as a fuel. One part of the heat of the burned fuel medium will be used then for the superheating of the steam passing through the serpent section 54 of the steam line, while the other part of the burner heat 55 will be utilized for the heating of the air of an air heater 56 which is preheating the air necessary for the burning of the oil or gas in burner 55. By this auxiliary equipment 53 we are able to stabilize the discharge of the accumulator at a predetermined superheat temperature level and operate the turbine at a fixed rated load. In practical applications it is found that about 5% of the accumulator capacity is sufficient to stabilize the operation of the accumulator 14 and provide superheated steam at its melting temperature at the valve 44 of the turbine 45.

Fig. 8 and Fig. 9 illustrate mirror 34 which is rotatable about heating boiler pipe 35. A plurality of these mirror and boiler units are connected together in parallel relation to each other and fastened above the top of the building as shown in the figure. While the mirror 34 is rotatably mounted in the housing 59 of the worm gear 58, the housing 59 is itself also rotatable about the axis of the worm in bearings 61—62 which are rested on wall consoles as in Fig. 9. The other end of each heating tube 35 is mounted movably on the tip of a bar 36 which has a ball socket mounting 64 on support 63 secured to the roof. At such mounting of the boiler tube 35 heat expansion of the heating tubes cannot cause serious heat stresses in the tubes. The worm gear 60 is driven by a clock-works 65. The heating tube 35 connects, through check valve 37 and steam line 36 via heating spiral 66 to the accumulator 14, and further down into downdraft tube 38. Tube 35, spiral coil 66 and downdraft line 38 forming an hermetically closed fluid circuit, the inside capacity of which is filled with distilled water. The amount of the distilled water corresponds to the critical volume of the circulating steam of said closed fluid circuit. By opening inlet valve 67 we may effect connection between feed water line 68 and heat exchanger 70 and coil 71 through upward line 69. Spiral 71 is located in the inside of the accumulator 14 and its first spiral 66. Spiral 71 leads to crossing 72, from which a downdraft line 73 leads to the isolated hotwater container 74. Crossing terminal 72 is also the starting point of another downdraft line 75 leading to distributing valve 77 of baking oven 76. Hot water accumulator 74 is in communication via upward pipe 78 with spiral 79 of heat exchanger 70, from whence it leads into the open as at 80. Between upward line 78 and water container 74 are connected, above the level of container 74, a plurality of parallelly connected heating bodies 82. Shut-off valve 81 is interposed between the bodies 82 and upward line 78. The condensate of the bodies is returned to container 74. Through distributing valve 77 of the hearth 76 we can connect line 75 either by line 84 which envelopes the baker 83 or with line 86 which serves for the heating of the cooking plate 85, separately or simultaneously. The discharge sides of lines 84 and 86 are drained via common line 87 into hotwater container 74. At the peak point of line 35 thermostat 88 is located. This thermostat will open valve 90 at a predetermined peak temperature through line 89. Through the opening of valve 90 connection will be established through line 91 between section 69 of the feed line 68 the feed line 68 and a section of 69 which lies between heat exchanger 70 and spiral 71 respectively.

The operation of the equipment disclosed in Fig. 8 and Fig. 9 is as follows. The sunheat collected and reflected by the mirrors 34 is transmitted to the heat pipes or boilers 35 by heat transfer, which are now adjusted in accordance to the position of the sun, and rotated by clock-works 65 in synchronism with the apparent movement of the sun. The heat pipes 35 will, therefore, due to the thermosyphon action of the closed fluid circuit, transfer their collected heats to the accumulator 14. In consequence of the thermosyphon action of the circuit, the steam pressure of pipes 35 begins to increase in proportion to the saturation pressure of accumulator 14 toward the corresponding temperature of the accumulator. This process will last until the critical parameters of the steam will be reached, which are 225 atmospheres and 374° C., at which point the condensation in spiral 66 will cease. With the ceasing of the condensation the heat transfer will begin to diminish in spiral 66, and consequently the temperature of tubes 35 may rise to nonpermissible limits. However, at the limit of the permissible temperature thermostat 88, which is in communication with valve 90 through line 89, will open relief valve 90 through which cold water from line 68 will flow upward through line 91 into spiral 71 wherein it will become greatly overheated superheated steam, but will flow in the form of low pressure steam into hotwater container 74 in which it will transfer its heat by condensation to the water of the container. Since the container 74 is in communication through line 78 and coil 79 of heat exchanger 70 with the atmosphere by overflow pipe 80, its overpressure cannot overstep the pressure differential which exists between the heads of pipe 80 and the head of the container 74 in water column. Accordingly, the temperature of container 74 also hardly can overstep the boiling temperature of the atmosphere which is 100° C. The cold water flowing through the spiral 71 of accumulator 14 will cool the sun mirror 34 and take away the surplus heat of heaters 35.

During times of cloudiness or at night, accumulator 14 cannot discharge through the unisolated portions comprising heating pipes 35 of the closed heating circuit, because check valve 37 will prevent a reserve of the unidirectional thermosyphon circuit. Consequently heating pipes 35 will be filled with stagnant hot water due to the steam pressure in hot spiral 66. This stagnant water in the tubes 35, however, acts rather as an insulation for the steam and cannot conduct away appreciable heat from the accumulator.

It can be seen, therefore, that the hereinabove described sunheat accumulator does not require any kind of operation attention. On the contrary, it stores the available heat of the sun during the hours of the maximum heat radiation and makes it constantly available for the high absorbing capacity of the accumulator 14 as storage heat. Now, therefore, if we want to utilize this sunheat for cooking, baking purposes or the heating of the house 57, it is possible through the opening of valve 67. We let water through heat exchanger 70 into spiral 71 and its low pressure but strongly overheated steam, through the opening of distributing valve 77 of hearth 76, can either be used for the heating of the baking oven 83 or for the heating plate 85 of the cooker 76. The condensates, produced in the lines 84 and 86 of the hearth will increase the heat content of container 74. The precipitation of the stem utilized through tubing 73 and 75 will return the major portion of its liquid heat to the water which flows to spiral 71 in line 69, so that the water leaving the overflow at 80 will carry off insignificant amounts of heat to the atmosphere. In this manner the heat exchange, created by the opening of valve 67 which controls the heat loss turned over to the surrounding atmosphere without utilization, can be pressed within very narrow limits. But even this loss can be eliminated during the night or the period of cloudiness by the shutting off of valve 67. For these latter cases, for the heating of the house, the hot-water heat of the container 74 is available.

In Fig. 10, for the purpose of an example, we assume that curve 100 characterizes the variable load of the boiler or boilers. Heat storage accumulator 14 will solve its expected purpose, if it will transfer the variable load curve 100 of the boilers to a stationary constant line 101. This will happen, when the "plus" areas during the time of the load minimums will be stored up by the accumulator 14, and this stored heat will then automatically produce the amount of steam indicated by the "minus" areas during the peak periods of the cycle. In this application it is shown that at least by manual means, and in function of the working parameters of the heat carrying agents, our above described cycle, by the help of our above-described accumulator 14 can store the "plus" surpluses and return them as generated steam or heat for the "minus" periods of the boiler load curve 100, so as to effect a constant steam load curve as at 101.

Various changes may be made in the embodiment of this invention without departing from the spirit thereof or narrowing its scope which will be defined in the appended claims.

We claim:

1. A solid heat absorbent accumulator system comprising in combination, a closed fluid circuit, a heat transmitting fluid in said circuit, a fluid supply and fluid discharge line connected to said circuit, an isolated heat accumulator for said circuit, a source of heat for said circuit, a heat transmitting spiral coil connected into said heat circuit to form a closed fluid circuit therewith and disposed in the inside of said accumulator, a heat accumulating solid medium packed inside of said accumulator and in heat transmitting working contact with said heat transmitting coil for accumulating and storing heat from the fluid of said heat circuit into said accumulating solid medium through thermal heat transmission through the walls of said spiral coil, the melting point of said heat absorbent solid medium being between the low and high temperature limits of the fluid in said heat circuit, said fluid supply line connecting said source of heat and said spiral coil to a source of feed water, means operatively interposed between said fluid supply line and said accumulator for returning the condensate of said accumulator coil into said fluid supply line, said means including a water separator connected to the outlet of the said accumulator, an automatic drain valve connected to said water separator, a centrifugal pump connected between said drain valve and said fluid supply line and operative upon the accumulation of a predetermined amount of separated water condensate from the accumulator to pump said condensate back into said fluid supply line.

2. A solid heat absorbent accumulator system comprising in combination, a closed fluid circuit, a heat transmitting fluid in said circuit, a fluid supply and fluid discharge line connected to said circuit, an isolated heat accumulator for said circuit, a source of heat for said circuit, a heat transmitting spiral coil connected into said circuit and disposed in the inside of said accumulator, a heat accumulating solid medium packed inside of said accumulator and in heat transmitting working contact with said heat transmitting coil for accumulating and storing heat from the fluid of said heat circuit into said accumulating solid medium through thermal heat transmission through the walls of said spiral coil, the melting point of said heat absorbent solid medium being between the low and high temperature limits of the fluid in said heat circuit, said fluid supply line connecting said source of heat and said spiral coil to a source of feed water, means operatively interposed between said fluid supply line and said accumulator for returning the condensate of said accumulator coil into said fluid supply line, said means including a water separator connected to the outlet of the said accumulator, an automatic drain valve connected to said water separator, a centrifugal pump connected between said drain valve and said fluid supply line and operative upon the accumulation of a predetermined amount of separated water condensate from the accumulator to pump said condensate back into said fluid supply line, and conduit means providing communication between the steam space of said water separator and the fluid discharge line of said heat circuit.

3. A solid heat absorbent accumulator system comprising in combination, a closed fluid circuit, a heat transmitting fluid in said circuit, a fluid supply and fluid discharge line connected to said circuit, an isolated heat accumulator for said circuit, a source of heat for said circuit, a heat transmitting spiral coil connected into said circuit and disposed in the inside of said accumulator, a heat accumulating solid medium packed inside of said accumulator and in heat transmitting working contact with said heat transmitting coil for accumulating and storing heat from the fluid of said heat circuit into said accumulating solid medium through thermal heat transmission through the walls of said spiral coil, the melting points of said heat absorbent solid medium being between the low and high temperature limits of the fluid in said heat circuit, a fluid supply line connecting said source of heat and said accumulator to a source of feed water, means operatively interposed between said fluid supply line and said accumulator coil for returning the condensate of said accumulator coil into said fluid supply line, said means including a water separator connected to the outlet of the said accumulator, an automatic drain valve connected to said water separator, a centrifugal pump connected between said drain valve and said fluid supply line and operative upon the accumulation of a predetermined amount of separated water condensate from the accumulator to pump said condensate back into said fluid supply line, and conduit means for providing communication between the steam space of said water separator and the fluid supply line of said heat circuit and said fluid supply line respectively.

4. A solid heat absorbent accumulator system comprising in combination, a first closed fluid circuit, a heat transmitting fluid in said circuit, a fluid supply and fluid discharge line connected to said circuit, an isolated heat accumulator for said circuit, a source of heat for said fluid, a first and second heat transmitting device, said first device being interconnected in said circut and both disposed in the inside of said accumulator, a first conduit means connected to the upper end of said first heat transmitting device and adapted for the flow of heated fluid to and from the same, a second conduit means connected to the lower end of said first heat transmitting device and adapted for the alternate flow of fresh fluid to and cold fluid from said device, an automatic valve control means in said first and second conduit for imparting the direction of fluid flow through said first heat transmitting device solid medium packed inside of said accumulator and in heat transmitting working contact with said heat transmitting device for accumulating and storing heat from the fluid of said heat circuit, into said accumulating solid medium through thermal heat transmission through the walls of said heat transmitting device, the melting point of said heat absorbent solid medium being between the low and high temperature limits of the fluid in said first heat circuit, said source of heat including a parabolic solar reflector, a boiler tube located in the focal axis of said reflector, conduit means between said boiler tube and said second heat transmitting device to form a second closed fluid circuit therewith, the volume of said second fluid circuit being equal to the critical volume of the filling feed water.

5. A solid heat absorbent accumulator system comprising in combination, at least one closed fluid circuit connected to a heat transmitting device, an isolated heat accumulator, a source of heat for said accumulator comprising said heat transmitting device and disposed inside of said accumulator, a heat transmitting fluid for said circuit and carried therein, a heat accumulating solid medium packed inside of said accumulator and in heat transmitting working contact with said heat transmitting device for accumulating and storing heat from the fluid of said circuit into said solid medium through thermal heat transmission through the walls of said heat transmitting device, the melting point of said heat absorbent solid medium being between the low and high temperature limits of the fluid in said circuit and substantially in excess of 212° F., a fluid supply and discharge line connected to said fluid circuit, valve means operatively interposed in at least one fluid circuit for reversing the flow of said heat transmitting fluid medium during its passage through at least one heat transmitting device, said source of heat including a plurality of parallelly interconnected boiler tubes heated by a plurality of parabolic solar heat reflectors, the exhaust ends of said boiler tubes being connected to a unitary exhaust manifold, the intake end of said boiler tubes being connected to a unitary intake manifold, power producing means operatively interposed between said intake and said exhaust manifolds respectively, and means operatively interposed between said accumulator and said power producing means for providing stationary super heat in said exhaust manifold, said last named means including a hot air furnace and fuel burner means therefor.

6. A solid heat absorbent accumulator system in accordance with claim 5 wherein a water level gauge is installed between the exhaust ends of said accumulator and the steam supply line of said closed fluid circuit.

References Cited in the file of this patent

UNITED STATES PATENTS

| | | |
|---|---|---|
| 290,851 | Calver | Dec. 25, 1883 |
| 1,094,301 | Caine | Apr. 21, 1914 |
| 1,119,063 | Burnap | Dec. 1, 1914 |
| 1,251,262 | Maurice | Dec. 25, 1917 |
| 1,338,644 | Arthur et al. | Apr. 27, 1920 |
| 1,425,174 | Cartter et al. | Aug. 8, 1922 |
| 1,790,555 | Plumb | Jan. 27, 1931 |
| 1,877,762 | Griswold | Sept. 20, 1932 |
| 1,922,509 | Thurm | Aug. 15, 1933 |
| 2,052,014 | Chamberlain | Aug. 25, 1936 |
| 2,338,691 | Tucker | Jan. 4, 1944 |
| 2,460,482 | Abbot | Feb. 1, 1949 |
| 2,460,499 | Grace | Feb. 1, 1949 |
| 2,544,474 | Swanton | Mar. 6, 1951 |

FOREIGN PATENTS

| | | |
|---|---|---|
| 865,725 | France | Mar. 10, 1941 |
| 102,388 | Great Britain | Jan. 4, 1917 |
| 366,528 | Great Britain | Feb. 1, 1932 |